US012802295B2

(12) United States Patent
Mondal et al.

(10) Patent No.: US 12,802,295 B2
(45) Date of Patent: Nov. 17, 2026

(54) COLOR ENHANCEMENT OF DIGITAL IMAGES TO MATCH A TEMPLATE

(71) Applicant: Adobe Inc., San Jose, CA (US)

(72) Inventors: Prasenjit Mondal, District-West Midnapore (IN); Sachin Soni, New Delhi (IN); Divya Kumar Singh, Noida (IN)

(73) Assignee: Adobe Inc., San Jose, CA (US)

( * ) Notice: Subject to any disclaimer, the term of this patent is extended or adjusted under 35 U.S.C. 154(b) by 174 days.

(21) Appl. No.: 18/751,027

(22) Filed: Jun. 21, 2024

(65) Prior Publication Data

US 2025/0391072 A1 Dec. 25, 2025

(51) Int. Cl.

| | |
|---|---|
| ***G06T 11/10*** | (2026.01) |
| ***G06T 5/20*** | (2006.01) |
| ***G06T 5/60*** | (2024.01) |
| ***G06T 5/70*** | (2024.01) |
| ***G06T 7/11*** | (2017.01) |
| ***G06T 7/13*** | (2017.01) |
| ***G06T 7/90*** | (2017.01) |
| ***G06T 11/60*** | (2006.01) |

(52) U.S. Cl.

CPC ................ *G06T 11/10* (2026.01); *G06T 5/20* (2013.01); *G06T 5/60* (2024.01); *G06T 5/70* (2024.01); *G06T 7/11* (2017.01); *G06T 7/13* (2017.01); *G06T 7/90* (2017.01); *G06T 11/60* (2013.01); *G06T 2200/24* (2013.01); *G06T 2207/10024* (2013.01); *G06T 2207/20032* (2013.01); *G06T 2207/20081* (2013.01); *G06T 2207/20084* (2013.01)

(58) Field of Classification Search

CPC ... G06T 11/60; G06T 7/11; G06T 7/13; G06T 7/90; G06T 5/60; G06T 5/70; G06T 11/10; G06T 7/136; G06F 40/186

See application file for complete search history.

(56) References Cited

U.S. PATENT DOCUMENTS

2012/0089933 A1* 4/2012 Garand ..................... G06F 8/38 715/765

2013/0265382 A1* 10/2013 Guleryuz ................ G06T 11/60 348/14.08

(Continued)

FOREIGN PATENT DOCUMENTS

| | | | | |
|---|---|---|---|---|
| CN | 113781408 A | * | 12/2021 | ............. G06N 3/045 |
| CN | 118134816 A | * | 6/2024 | ............... G06T 5/10 |
| KR | 102247778 B1 | * | 5/2021 | ......... G06F 16/9035 |

OTHER PUBLICATIONS

Daniel Cohen-Or, Olga Sorkine, Ran Gal; Color Harmonization (Year: 2006).*

*Primary Examiner* — Weiming He

(74) *Attorney, Agent, or Firm* — FIG. 1 Patents

(57) ABSTRACT

In implementations of techniques and systems for color enhancing digital images to match templates, a processing device implements a color effects module to receive a digital image to be inserted into a template. The color effects module identifies one or more dominant colors of the digital image and the template. The color effects module determines a harmonic match between the image dominant colors and the template dominant colors. The processing device then outputs a modified digital image to which the image dominant color of the harmonic match is applied as a color effect.

20 Claims, 11 Drawing Sheets

(56) References Cited

U.S. PATENT DOCUMENTS

| | | | | |
|---|---|---|---|---|
| 2014/0187223 | A1* | 7/2014 | Ivanchenko | G06V 20/63 455/418 |
| 2020/0160567 | A1* | 5/2020 | Vallespi | G06T 11/10 |
| 2023/0419574 | A1* | 12/2023 | Yamada | G06T 11/10 |
| 2025/0086994 | A1* | 3/2025 | Schaumberg | G06T 7/13 |

* cited by examiner

700

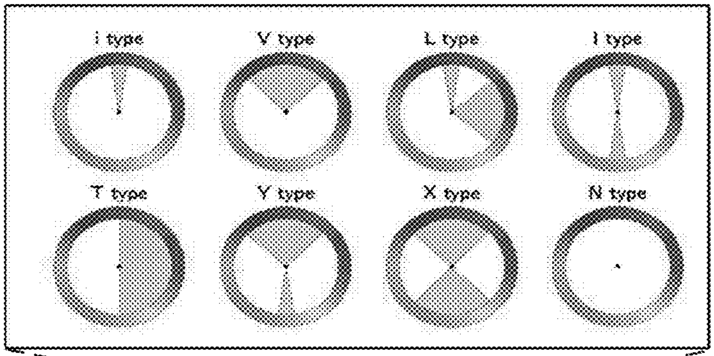

Harmonic Templates $H$
702

704
For each dominant color $t_i$ in the template, determine the minimum distance between $t_i$ and sector boundaries in $h_j$ 706
For each dominant color $u_i$ in the digital image, determine the minimum distance between $u_i$ and sector boundaries in $h_j$ 708
Find the particular template dominant color $t_i$ closest to any sector boundary in the harmonic templates $H$ 710
Arrange the image dominant colors $u_i$ in decreasing order of those closest to a sector boundary associated with the harmonic template in block 708

Harmonic match 216

Fig. 7

COLOR ENHANCEMENT OF DIGITAL IMAGES TO MATCH A TEMPLATE

BACKGROUND

Image processing systems provide various functionalities for creating and editing images and other digital content provided by users. However, user-provided content may not match the coloring or visual characteristics of the existing digital content, such as a template, into which it is added. To address this issue, content creators often use manual image editing techniques to apply visual effects to digital images or templates. This involves modifying the image's color and other visual characteristics to match the template or vice-versa. Despite many content creation tools providing preset color effects or manual adjustments, these tasks are ineffective, time-consuming, and require the expertise to manipulate various aspects of the uploaded or existing content.

SUMMARY

Techniques and systems for color enhancement of digital images to match a template are described. In one example, a processing device receives a digital image for insertion into a digital template. To match the coloring of the digital image to that of the digital template, the processing device uses a machine-learning model to identify the dominant colors of both the digital image and the digital template. The processing device then determines a harmonic match between the dominant colors. The processing device applies the image's dominant color from the harmonic match as a color effect to the digital image to generate a modified digital image. The processing device inserts the modified digital image into the digital template.

This Summary introduces a simplified selection of concepts that are further described below in the Detailed Description. As such, this Summary is not intended to identify essential features of the claimed subject matter or to aid in determining its scope.

BRIEF DESCRIPTION OF THE DRAWINGS

The detailed description is described with reference to the accompanying FIGURES. Entities represented in the figures are indicative of one or more entities, and thus, reference is made interchangeably to single or plural forms of the entities in the discussion.

FIG. 7 depicts a procedure in an example implementation showing the operation of a harmonic colors module that employs the techniques described herein to identify harmonic matches among the dominant colors of digital content.

DETAILED DESCRIPTION

Overview

Figure 1:
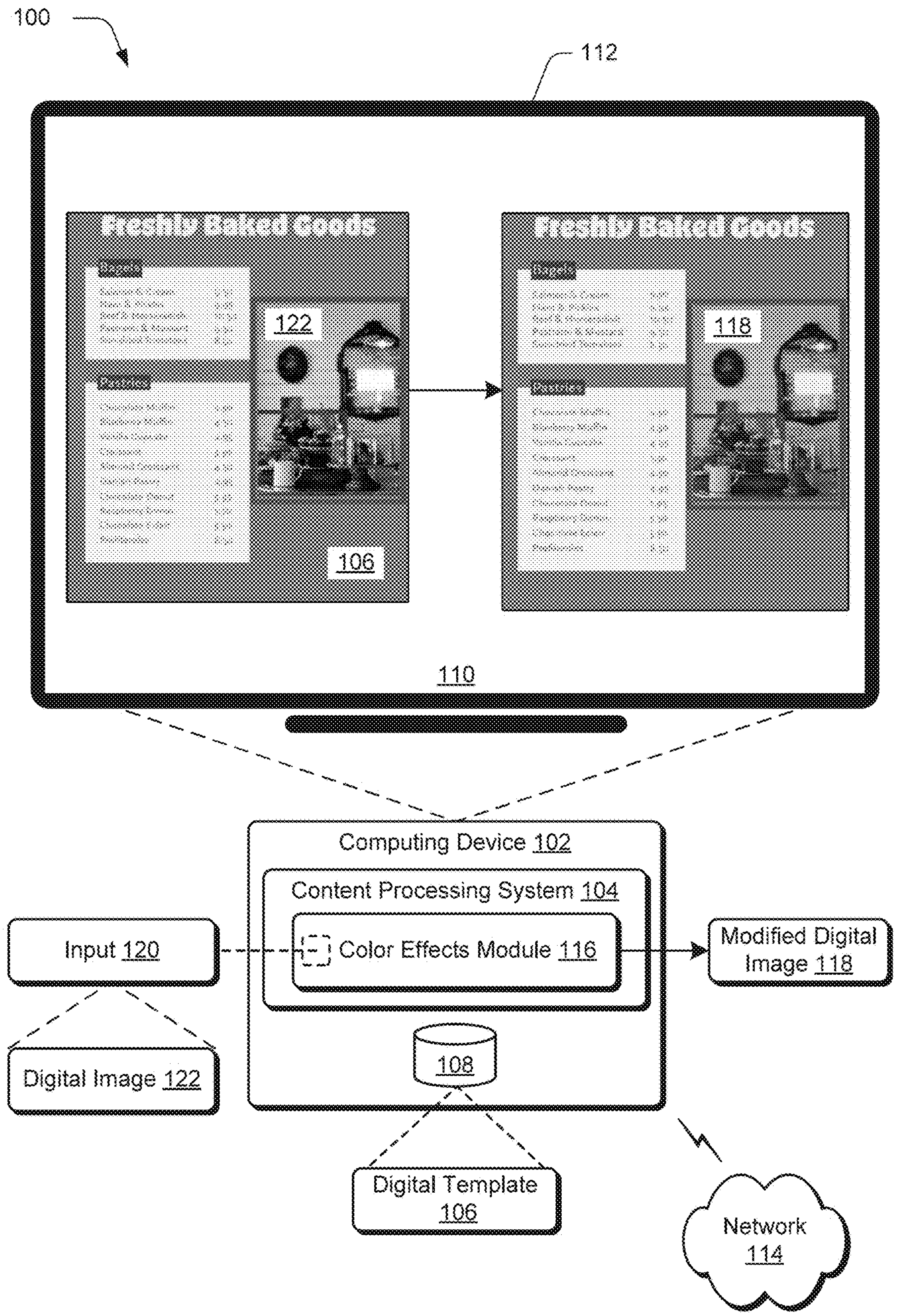
FIG. 1 illustrates a digital medium environment in an example implementation that is operable to employ color enhancement to match a digital image to a template as described herein.

Content creation services provide users with convenient ways to create and edit digital content. Such content can range from simple items like party invitations and family newsletters to more complex materials like business promotional materials and presentations. These services typically offer a variety of templates to choose from, making the creation process simpler and more efficient. In addition, users can customize the templates by applying different effects, changing colors, or resizing various objects, texts, and backgrounds.

It is common for users to personalize templates by adding their own digital images or replacing existing ones. However, user-provided images may not visually blend well with the template, resulting in a final product of poor aesthetics. To address this issue, conventional content creation services provide manual editing or pre-defined coloring effects to match the coloring of uploaded images with that of templates. These methods are often time-consuming and ineffective, causing user frustration and disappointment.

To overcome these and other limitations, this document describes techniques and systems to enhance the coloring of a digital image to aesthetically match a template. For example, a computing device implements a color effects module to receive a digital image to be inserted into a template. The color effects module uses a machine-learning model to generate an image segmentation map for the digital image. An example of the machine-learning model includes a convolutional neural network that partitions the digital image into multiple segments.

The color effects module then determines the dominant color(s) for each segment of the multiple segments. If not already known, the dominant colors for the template are also determined. Dominant colors represent colors most used or prevalent in digital content or a portion thereof. The color effects module uses a color harmonization procedure to identify a harmonic match between the dominant colors. A harmonic match is a set of aesthetically pleasing colors in terms of human visual perception. To determine the harmonic match, the color harmonization procedure uses one or more harmonic templates, which define groups of colors on a color wheel that blend well together. The color effects module then color enhances the digital image by applying the image dominant color from the harmonic match as a color effect and the modified digital image inserted in the template is output via a user interface.

Consider a restaurant owner who is creating a menu for a café to distribute at local businesses or to place on a website. The café specializes in freshly baked goods, including a variety of bagels and pastries. The owner uses a template in a content creation service to list the available items with corresponding prices.

The restaurant owner wants to personalize the menu by adding a photo of the café counter with some baked goods on display. However, after uploading the photo, the owner realizes that the photo is too bright and does not fit well with the menu's color scheme. The owner attempts to manually adjust the brightness and coloring using a conventional content creation service but is dissatisfied with the results. Despite trying different visual parameters and coloring effects on the photo and template for an hour, the owner is still unable to achieve the desired aesthetics. As a result, the owner decides to either publish the menu without the photo or with a suboptimal colored photo that does not visually match the menu.

While conventional content creation services often fail to generate satisfactory results, the described techniques and systems for color enhancement provide an effective solution. For example, the described color effects module allows the restaurant owner to quickly modify the uploaded photograph to match the aesthetics of the menu. Upon uploading the photograph, the color effects module identifies the dominant color(s) present in the photograph. As the restaurant owner is using a provided template, the dominant color(s) of the template are already known. The color effects module then analyzes the dominant colors of the photograph and template to identify a harmonic match. The color effects module applies the photograph's dominant color from this harmonic match as a color effect to the photograph, resulting in a modified photograph that aesthetically matches the menu.

The described color enhancement techniques help improve the quality of digital content provided by users. This results in modified images that are more aligned with templates and other digital content into which the user-provided images are inserted. Users have the option to apply color enhancement manually or have images automatically modified. In one example, the color enhancement is updated in real-time as the user modifies the coloring or other template aspects. These approaches and other approaches described herein make it easy and efficient for users to create personalized digital content, providing a superior experience compared to conventional content creation services.

In the following discussion, an example environment is described that employs the techniques described herein. Example procedures are also described which are performable in the example environment and other environments. Consequently, performance of the example procedures is not limited to the example environment and the example environment is not limited to performance of the example procedures.

Example Digital Content Enhancement Environment

FIG. 1 is an illustration of a digital medium environment 100 in an example implementation that is operable to employ color enhancement to match a digital image to a template, as described herein. The illustrated environment 100 includes a computing device 102, which is configurable in various ways.

The computing device 102, for instance, is configurable as a processing device such as a desktop computer, a laptop computer, a mobile device (e.g., assuming a handheld configuration such as a tablet or mobile phone), and so forth. Thus, the computing device 102 ranges from full-resource devices with substantial memory components and processor resources (e.g., personal computers and game consoles) to a low-resource device with limited memory and/or processing resources (e.g., mobile devices). Additionally, although a single computing device 102 is shown, the computing device 102 is also representative of a plurality of different devices, such as multiple servers utilized by a business or service to perform operations "over the cloud," as described in FIG. 11.

The computing device 102 is illustrated as including a content processing system 104. The content processing system 104 is implemented at least partially in hardware of the computing device 102 to process the digital template 106, which is illustrated as maintained in storage 108 of the computing device 102. Such processing includes creation of the digital template 106, modification of the digital template 106, and rendering of the digital template 106 in a user interface 110 for output, e.g., by a display device 112. Although illustrated as implemented locally at the computing device 102, functionality of the content processing system 104 is also configurable in whole or in part via functionality available via a network 114, such as part of a web service or "in the cloud."

An example of functionality incorporated by the content processing system 104 to process the digital template 106 is illustrated as a color effects module 116. The color effects module 116 is configured to generate a modified digital image 118 based on an input 120, which includes a digital image 122, and the digital template 106. Generally, the digital image 122 is uploaded or otherwise provided by a user, and the digital template 106 is digital content into which the digital image 122 is inserted. In other implementations, the digital template 106 is any form of digital content into which a user inserts the digital image 122, whether generated from a template or started from scratch by the user. For instance, in the illustrated example, the color effects module 116 receives a digital image 122 that depicts a café's interior. The digital template 106 is a menu of baked goods for the café. In other implementations, the digital template 106 is a series of digital images, a digital video, or other digital content.

Based on the digital image 122 and the digital template 106, the color effects module 116 is operable to generate the modified digital image 118. The digital image 122 is adjusted to better match the coloring of digital template 106. For instance, the uploaded café picture (e.g., the digital image 122) is blended with an orange hue or color effect to aesthetically match the coloring of the digital template 106.

As illustrated in FIG. 1, the color effects module 116 generates the modified digital image 118 to aesthetically match the coloring of the digital image 122 to the digital template 106. The described color matching is often not possible using conventional techniques that offer a limited number of preset color effects. Such preset color effects generally do not match the dominant colors of the digital template 106 and further exacerbate the color mismatch. Other conventional techniques offer the ability to adjust various image characteristics (e.g., color saturation, color tone, brightness, contrast, sharpness, and transparency) of the digital image 122 or the digital template 106. This manual tuning is very difficult and time-consuming to find the correct combination of correction values to generate a modified digital image that matches the template. The techniques described herein overcome the limitations of conventional techniques that are often ineffective and/or inefficient, especially if multiple digital images 122 are added to a digital template 106.

Further discussion of these and other advantages of applying color effects to user-provided digital images to match a template is included in the following sections and shown in the corresponding figures. In particular, an example system, e.g., the color effects module 116, is first described, employing examples of techniques described herein. Example procedures are also described which are performable in the example system and other systems. Consequently, the performance of the example procedures is not limited to the example system, and the example system is not limited to the performance of the example procedures. Aspects of each of the procedures are implemented in hardware, firmware, software, or a combination thereof. The procedures are shown as a set of blocks that specify operations performed by one or more devices and are not necessarily limited to the orders shown for performing the operations by the respective blocks.

Example Digital Content Enhancement Systems and Techniques

Figure 2:
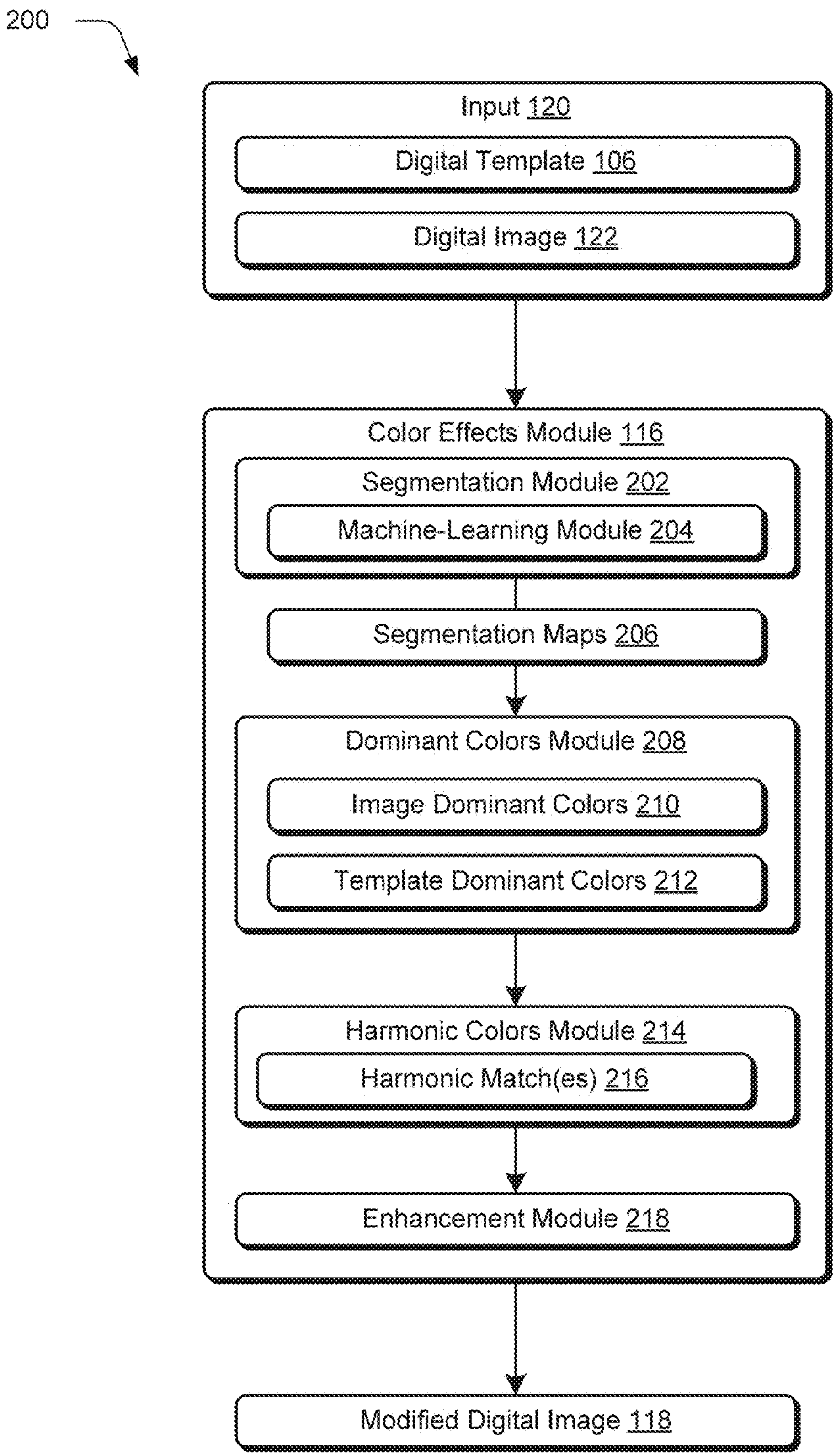
FIG. 2 depicts a system in an example implementation showing operation of a color effects module of FIG. 1 in greater detail as employing the techniques described herein.

FIG. 2 depicts a system 200 in an example implementation showing operation of a color effects module 116 of FIG. 1 as employing the techniques described herein. Generally, the color effects module 116 is operable to apply coloring, visual enhancements, and/or a background condition to match coloring of digital image 122 to a digital template 106 and output a modified digital image 118. The color effects module 116 is illustrated to include a segmentation module 202, a dominant colors module 208, a harmonic colors module 214, and an enhancement module 218.

Color-Based Segmentation

In one implementation, the segmentation module 202 employs color-based segmentation to aid in determining the dominant colors of a digital image, e.g., the digital image 122 or digital template 106, in accordance with the techniques described herein. Color-based segmentation is applied to a digital image to generate a segmentation map 206; however, in some scenarios, other processing steps are applied to the digital image prior to color-based segmentation. For example, a median filter is applied to a digital image to remove noise from the digital image. As another example, a grey-scale image is computed from the digital image using a median filter, followed by image segmentation. When performed, the grey-scale image is computed on the original or filtered digital image using a machine-learning model 204.

Generally, color-based segmentation assigns a label to pixels (e.g., every pixel or a subset of pixels) of a digital image based on their characteristics, e.g., color and/or shading, of the pixels. The pixels with the same labels are grouped together to create a color-based segmentation map that masks objects of the digital image. The masks of the segmentation map 206 are generally different colors but may also be implemented using different shades of grey.

In one or more implementations, the machine-learning model 204 is implemented using a convolutional neural network trained to perform color-based image segmentation on the digital image 122. The machine-learning model 204 includes a contracting path and an expanding path. The contracting path, sometimes called the encoder path, is configured to perform a plurality of convolutions for downsampling the spatial resolution of the digital image 122. The downsampling generates lower-resolution feature mappings that the machine-learning model 204 is learned to be highly efficient at discriminating between classes. The expanding path, sometimes called the decoder path, performs a plurality of convolutions for upsampling the feature representations into a full-resolution segmentation map 206. In particular, the machine-learning model 204 associates the labeled pixels with respective objects and provides color-based or grey masks to the objects, thereby identifying the boundaries of the objects in the segmentation map 206.

Figure 3:
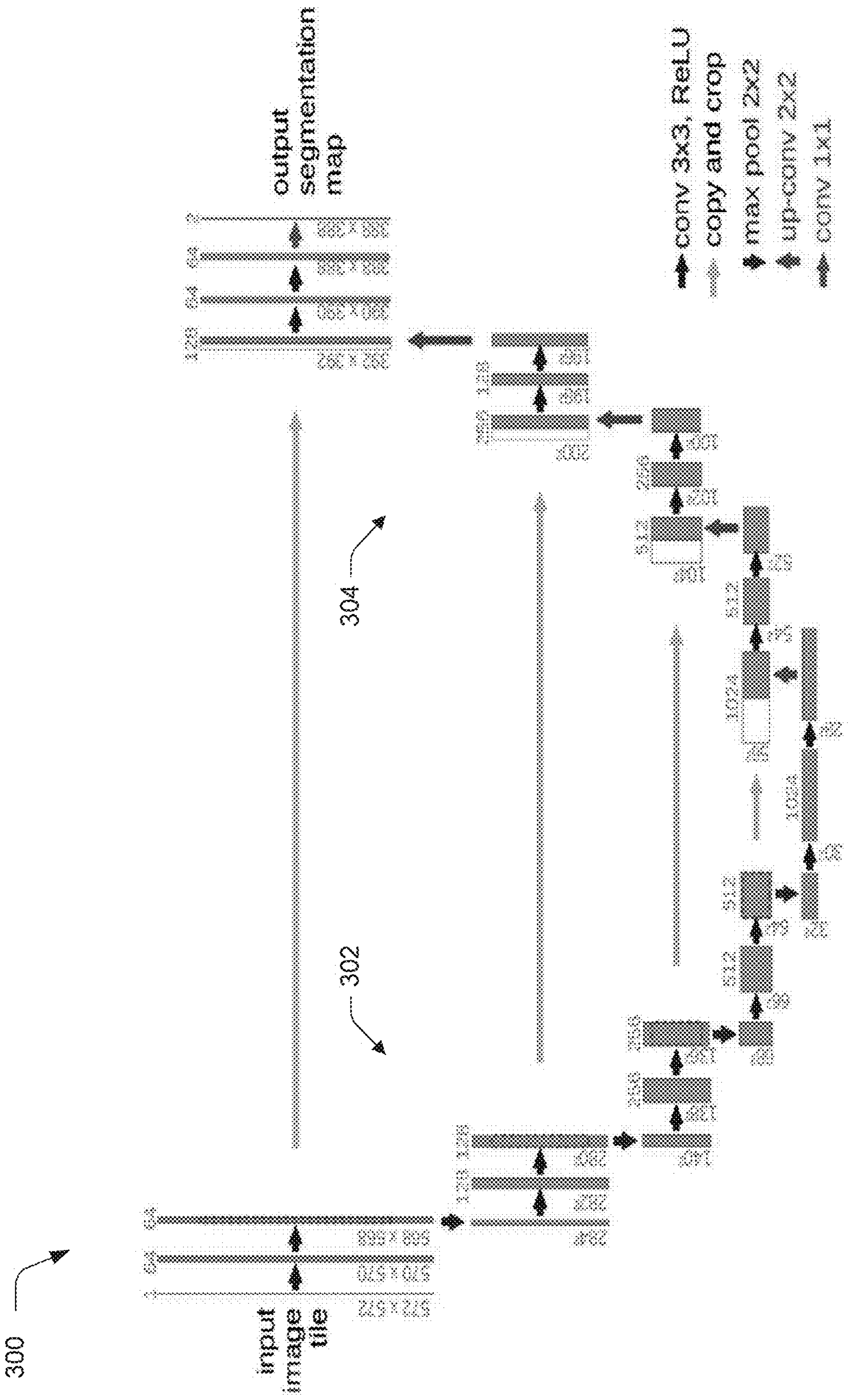
FIG. 3 depicts an example of a network architecture of an example machine learning model suitable for performing color-based segmentation on a digital image in accordance with the techniques described herein.

FIG. 3 illustrates an example of a network architecture 300 of a machine-learning model (e.g., the machine-learning model 204) suitable for performing color-based segmentation on a digital image (e.g., the digital image 122). The architecture includes a contracting path 302 and an expanding path 304.

The blue boxes of FIG. 3 correspond to a multi-channel feature map. The number of channels is denoted at the top of each box. The x-y size is provided at the lower-left edge of each box. The white boxes represent a copied feature map, and the arrows denote the different operations, as described in greater detail below.

In the example network architecture 300, the contracting path 302 supports the repeated application of two "3×3" convolutions, e.g., unpadded convolutions, to the digital image. Each convolution is followed by a rectified linear unit (ReLU) operation and a "2×2" max pooling operation with a stride of "2" for downsampling. At each downsampling step, the number of feature channels is doubled.

Each step of the expanding path 304 supports an upsampling of the feature map followed by a "2×2" convolution, e.g., up convolution, that halves the number of feature channels. Each step then includes a concatenation with a correspondingly cropped feature map from the contracting path and two "3×3" convolutions, each of which is followed by a ReLU. The cropping is necessary to address the loss of border pixels in each convolution. At the final illustrated layer, a "1×1" convolution is used to map each 64-component feature vector to the desired number of classes.

The example network architecture 300 has twenty-three convolutional layers. Input tile size is also selectable such that the "2×2" max-pooling operation are applied to a layer with an even "X" and "Y" size to support tiling of the output segmentation map 206. Semantic segmentation is then applied to the digital image to assign pixel-level masking of the objects in the digital image 122.

Figure 4:
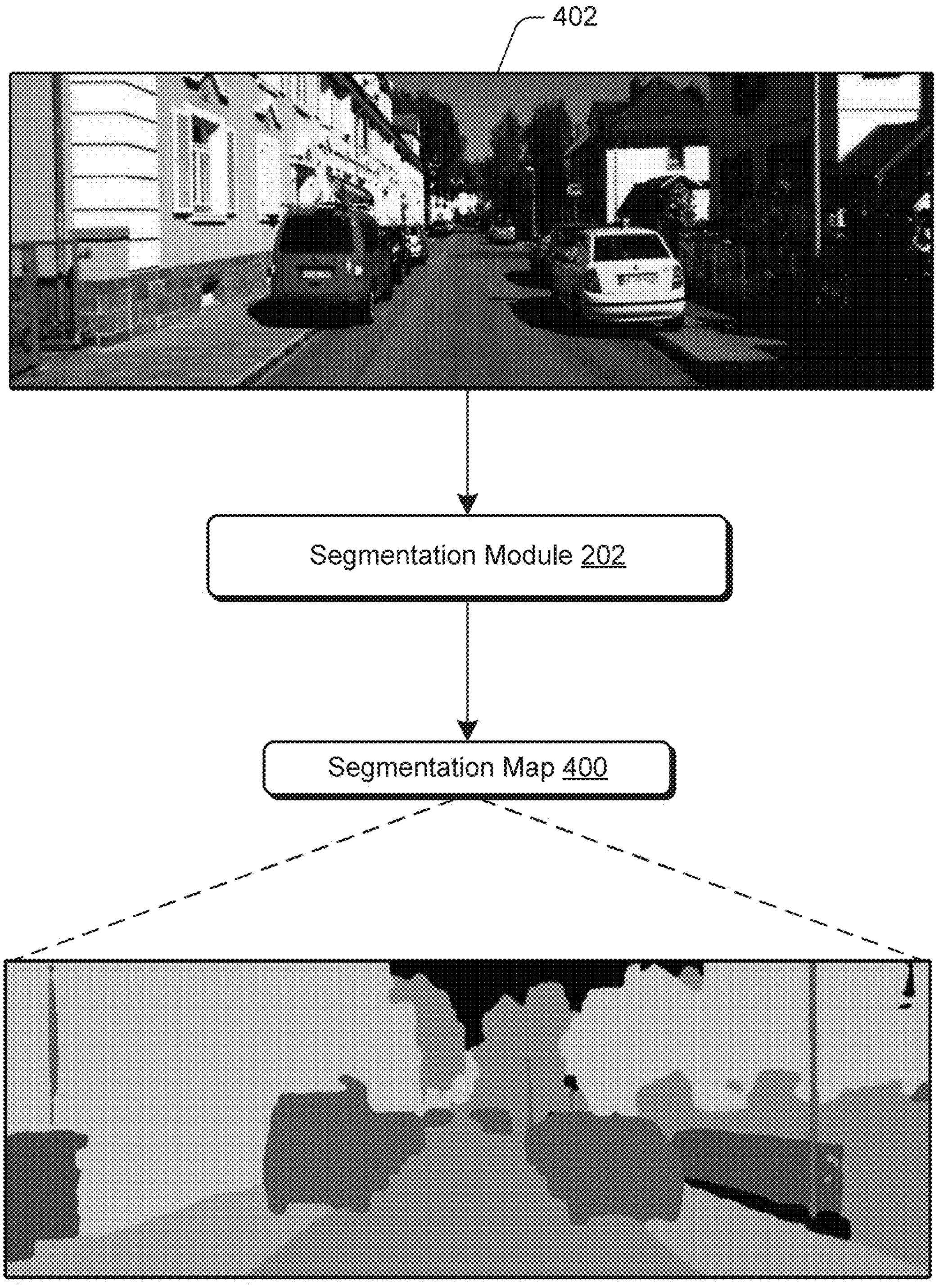
FIG. 4 illustrates an example of operation of a segmentation module to generate a segmentation map.

FIG. 4 illustrates an example of the operation of the segmentation module 202 to generate a segmentation map 400 from a digital image 402. In particular, the segmentation module 202 applies color-based segmentation to the digital image 402 using the machine-learning model 204 or the network architecture 300 to generate the segmentation map 400, which includes eight color segments. Some of the color segments in the segmentation map 400 are divided by other color segments, e.g., there are several red color segments.

Dominant Colors Identification

A dominant colors module 208 is employed to determine the dominant colors of a digital image (e.g., the digital image 122 and digital template 106) in accordance with the techniques described herein. In particular, the dominant colors module 208 uses the segmentation map 206 to identify image dominant colors 210 in the digital image 122 that correspond to one or more segmented regions. The dominant colors module 208 also identifies template dominant colors 212 in the digital template 106. In scenarios where the digital template 106 is a stock template of the content processing system 104, the template dominant colors 212 are known a priori and retrieved by the dominant colors module 208.

Dominant colors include the most prevalent colors that take up a significant portion of the digital image 122 or the digital template 106 and shape a user's overall visual impression. In other words, dominant colors tend to stand out and influence an observer's response to an image. Using a quantity definition, the color(s) that appear in the largest number of pixels of the image or a portion thereof is the dominant color(s). In other implementations, the dominant color(s) are defined as color areas that appear more striking or visually salient, even if they are smaller than other color areas.

Figure 5:
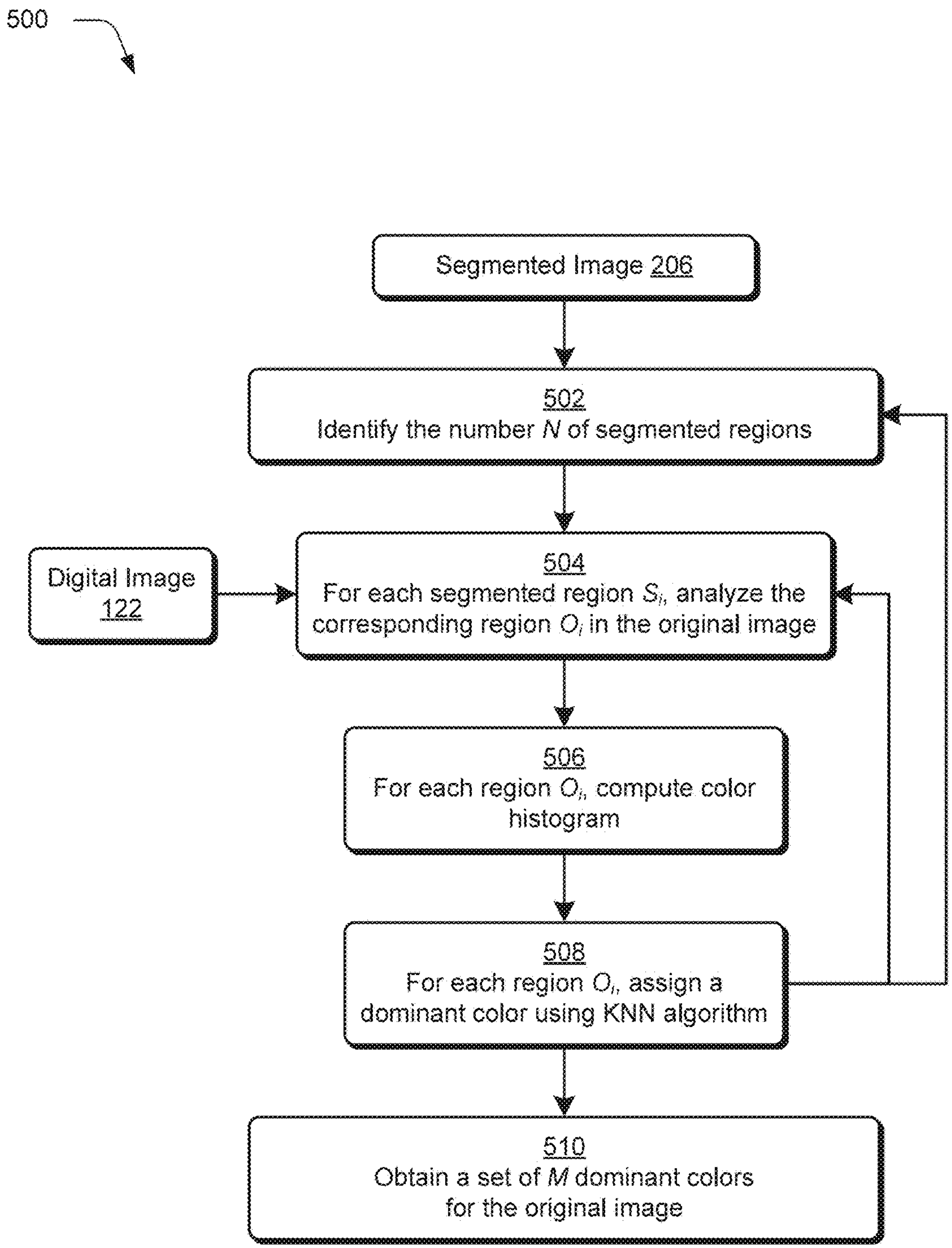
FIG. 5 depicts a procedure in an example implementation showing the operation of a dominant colors module that employs the techniques described herein to identify dominant colors of digital content.

FIG. 5 is a flow diagram depicting an algorithm as a step-by-step procedure 500 in an example implementation that is performable by a processing device (e.g., the dominant colors module 208) to identify the dominant color(s) in digital content (e.g., the digital image 122 and digital template 106).

The dominant colors module 208 uses the segmentation map 206 to identify the number N of segmented regions S in the digital image 122 (block 502). For example, the segmentation map 400 for digital image 402 includes eight segments (e.g., N=8).

For each segmented region $S_i$, the dominant colors module 208 analyzes the corresponding region $O_i$ in the digital image 122, where i equals an integer value from 1 to N (block 504). Continuing the previous example, the dominant colors module 208 analyzes the parked cars (e.g., $O_1$) in the digital image 402 that correspond to the red regions (e.g., $S_1$) in the segmentation map 400.

The dominant colors module 208 then computes a color histogram for the corresponding region $O_i$ (block 506). A color histogram represents the distribution of the composition of colors in an image, showing the different colors and the number of pixels in each color. A color histogram can also be expressed as three luminance histograms, each showing the brightness distribution of each Red/Green/Blue color channel. For example, the dominant colors module 208 determines a color histogram for the cars (from the red regions) in the digital image 402.

For the region $O_i$ under consideration, the dominant colors module 208 classifies the digital image 122 using K-Nearest Neighbors (KNN) classification by the machine-learning model 204 or another machine-learning model (block 508). KNN classification is a type of machine-learning technique that classifies data points (e.g., pixels) based on the similarity of other data points. In particular, KNN classification is a non-parametric, supervised learning classifier that uses proximity to make classifications or predictions about the grouping of an individual pixel, with the output for the pixel being a class (e.g., color) membership. For example, imagine a photograph that includes many red and blue pixels. Using KNN classification, the machine-learning model 204 assigns a particular pixel under consideration based on the color of the majority of the neighboring pixels. A pixel is assigned to the class most common among its k nearest neighbors, where k is a positive integer (e.g., typically a small value). If k equals 1, then the pixel is simply assigned to the class or color of its single nearest neighbor. Using the KNN technique, the dominant colors module 208 determines a dominant color for the region $O_i$. In other implementations, the dominant colors module 208 identifies multiple dominant colors for the region $O_i$.

The dominant colors module repeats blocks 504, 506, and 508 to obtain a set of M dominant colors for each region $O_i$ in the digital image 122 (block 510). If a single dominant color is determined for each region, then M is equal to or less than N (e.g., some regions O may have the same dominant colors). If not known a priori, the dominant colors module 208 repeats procedure 500 for the digital template 106.

Figure 6:
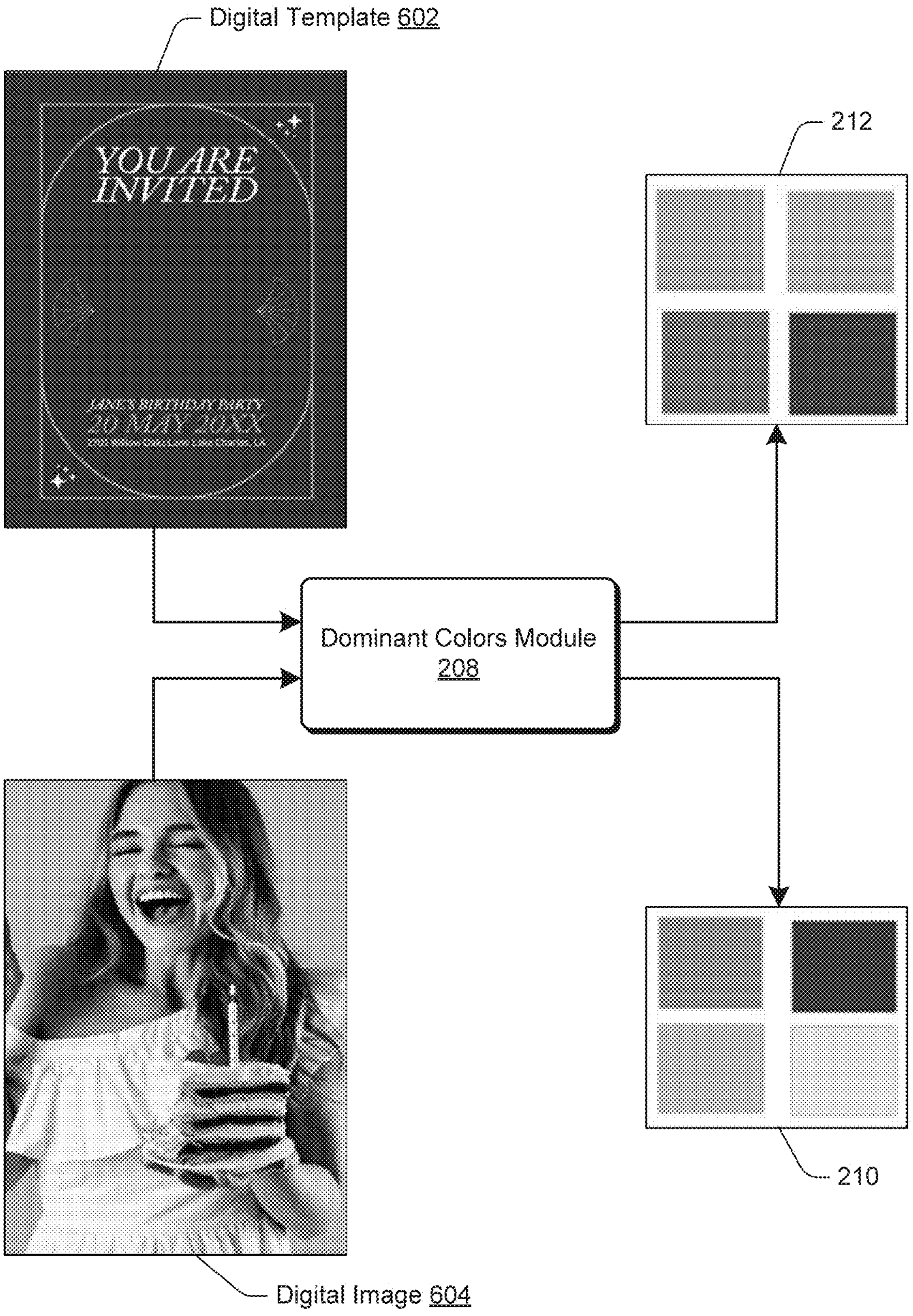
FIG. 6 illustrates an example of operation of a dominant colors module to determine the dominant colors of a digital image and template.

FIG. 6 illustrates an example of the operation of the dominant colors module 208 to identify the dominant colors of an example digital template 602 and digital image 604. The digital template 602 is a birthday party invitation on a dark green background. Four template dominant colors 212 (e.g., dark green, green, yellowish green, and beige) are identified for the digital template 602.

The user uploads the digital image 604 of a guest of honor holding a slice of cake for insertion into the birthday party invitation. The dominant colors module 208 identifies four image dominant colors 210 (e.g., pink, light pink, brown, and light brown) for the digital image 604.

Harmonic Color Identification

A harmonic colors module 214 is employed to determine harmonic match(es) 216 among dominant colors in accordance with the techniques described herein. In particular, the harmonic colors module 214 identifies a harmonic match between the image dominant colors 210 and the template dominant colors 212. A harmonic match (or harmonic colors) is a color set that is visually pleasing and aesthetically balanced. The image dominant color 210 in the harmonic match 216 is then applied as a color effect to the digital image 122 and/or digital template 106 to visually blend them together.

FIG. 7 depicts a procedure 700 in an example implementation showing the operation of the harmonic colors module 214 that employs techniques described herein to identify harmonic matches among the dominant colors. Color harmonization is analyzed using an image's hue-saturation-value (HSV) color channel, which provides a color representation of the image.

In the illustrated implementation in FIG. 7, the harmonic colors module 214 uses eight harmonic templates ($h_j$) 702 to identify harmonic matches 216 among the image dominant colors 210 and the template dominant colors 212. A different number or different set of harmonic templates 702 are used in other implementations of procedure 700. Each harmonic template 702 identifies a distribution of hue colors that are aesthetically balanced. In other words, colors with hues that fall in the gray wedges of a harmonic template 702 are defined as harmonic matches according to that template.

The harmonic templates 702 define radial relationships on the HSV color wheel, rather than specific colors. For example, harmonic colors include analogous colors that share similar hues (e.g., types i, V, and T) and complementary colors that are opposite each other on the color wheel but create a high-contrast, vibrant combination (e.g., types I, Y, and X). The harmonic matches also include contrasting colors that provide more complex color combinations (e.g., type L and its mirror image). The harmonic sectors (e.g., gray wedges) in the harmonic templates 702 are the domains over which membership functions are defined, with each sector having two sector boundaries. Some harmonic templates 702 (e.g., types L, I, Y, and X) include two sectors (e.g., gray regions) and four sector boundaries.

In procedure 700, let T={$t_1$, $t_2$, . . . , $t_n$} be n dominant colors determined for digital template 106 using procedure 500 or from previous knowledge. In the example from FIG. 6, n is equal to four. Similarly, let U={$u_1$, $u_2$, . . . , $u_m$} be the m dominant colors determined for digital image 122 using procedure 500 or from previous knowledge. In the example from FIG. 6, m is equal to four. Let H={$h_1$, $h_2$, . . . , $h_8$} be the eight harmonic templates 702.

For each dominant color in digital template 106 and each harmonic template 702, the harmonic colors module 214 determines the minimum distance between the dominant color and the sector boundaries (block 704). For each $t_i$ in T where 1≤i≤n, the minimum distance $td_i$ between $t_i$ and each sector boundary in $h_j$, where 1≤j≤8, is computed. The minimum distance $td_i$, along with the corresponding sector boundary for which the minimum value is obtained, is stored as TD={$td_1$, $td_2$, . . . , $td_n$}.

Similarly, for each dominant color in digital image 122 and each harmonic template 702, the harmonic colors module 214 determines the minimum distance between the dominant color and the sector boundaries (block 706). For each $u_i$ in U where 1≤i≤m, the minimum distance $ud_i$ between $u_i$ and each sector boundary in $h_j$, where 1≤j≤8, is computed. The minimum distance $ud_i$, along with the corresponding sector boundary for which the minimum value is obtained, is stored as UD={$ud_1$, $ud_2$, . . . , $ud_n$}.

The harmonic colors module 214 then finds the dominant color closest to any sector boundary in the harmonic templates 702. Several scenarios exist for the color effects module 116 to apply color effects: (1) fix the digital template 106 and apply color effects on the digital image 122, (2) fix the digital image 122 and apply color effects on the digital template 106, and (3) apply color effects to both digital template 106 and digital image 122. For illustration purposes, procedure 700 describes the first scenario and applies the color effects on the digital image 122, while maintaining the coloring of digital template 106. However, similar procedures may be applied to digital template 106 or both pieces of digital content for the second and third scenarios above.

To apply a color effect to the digital image 122, the harmonic colors module 214 considers TD (associated with digital template 106) and determines the particular template dominant color $t_i$ that is the closest to any sector boundary in any harmonic template, H, 702 (block 708). The harmonic template and sector boundary associated with the particular template dominant color is also noted. The harmonic colors module 214 then considers UD (associated with digital image 122) and arranges the image dominant colors $u_i$ in decreasing order of their proximity or closeness to a sector boundary of the harmonic template associated with the template dominant color with the smallest distance to a sector boundary (block 710). The harmonic match 216 is identified as the image dominant color $u_i$ closest to a sector boundary in the harmonic template 702 associated with block 708 and the template dominant color from block 708.

Image Enhancement

An enhancement module 218 is employed to apply the harmonic image color of the harmonic match 216 as a color effect to the digital image 122 to generate a modified digital image 118 in accordance with the techniques described herein. As described above, the enhancement module 218 applies a color effect based on the harmonic image color to digital template 106, alone or in combination with the digital image 122, in other implementations. The modified digital image 118 better gels or is more aesthetically balanced with the digital template 106.

In particular, the enhancement module 218 shifts the hue values of the digital image 122 to fit the harmonic image color, while considering spatial coherence among colors of neighboring pixels using an optimization technique. Blending the harmonic image color on the digital image 122 generally smoothens the image and decreases local features to cause a blurry appearance. The enhancement module 218 improves the image detailing (e.g., unblurs) of the blended digital image by computing image gradients to detect edges therein. The edges are identified as significant local intensity changes and defined as sets of connected pixels forming boundaries between two disjoint regions.

Edges are generally represented as black pixels. For each black pixel in the edges, the enhancement module 218 stretches the corresponding pixel in the blended digital image to improve the image's sharpness. Pixels are stretched using a histogram stretching technique, which includes modifying the brightness (intensity) values of pixels in the image according to some mapping function that specifies an output pixel brightness value for each input pixel brightness value. After the stretching is completed, the enhancement module 218 outputs the modified digital image 118 with the color effects based on the harmonic image color applied.

Figure 8:
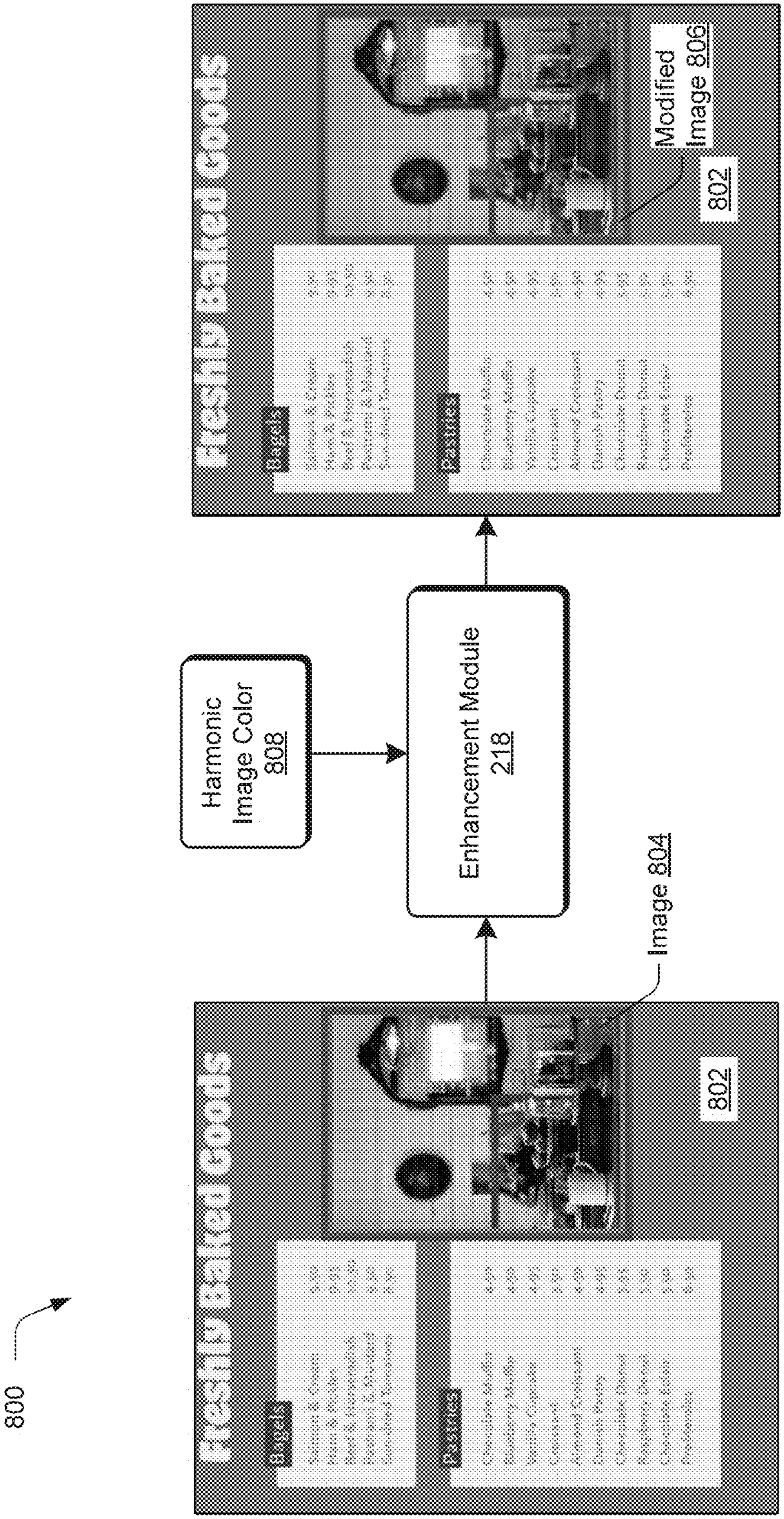
FIG. 8 illustrates an example of operation of an enhancement module to apply a harmonic match as a color effect to an image.

FIG. 8 depicts an example 800 of operation of the enhancement module 218 to apply a harmonic image color of the harmonic match 216 as a color effect to a digital image. Continuing the café example from above, the restaurant owner has selected template 802, which has an orange background, as a menu. The restaurant owner uploads image 804, which is a photograph of the café's counter, for insertion in template 802. The enhancement module 218 applies a harmonic image color 808 (e.g., an orange hue) from the harmonic match 216 as a color effect to image 804 to generate modified image 806. As illustrated in example 800, the modified image 806 has an orange tint and visually matches template 802.

Figure 9:
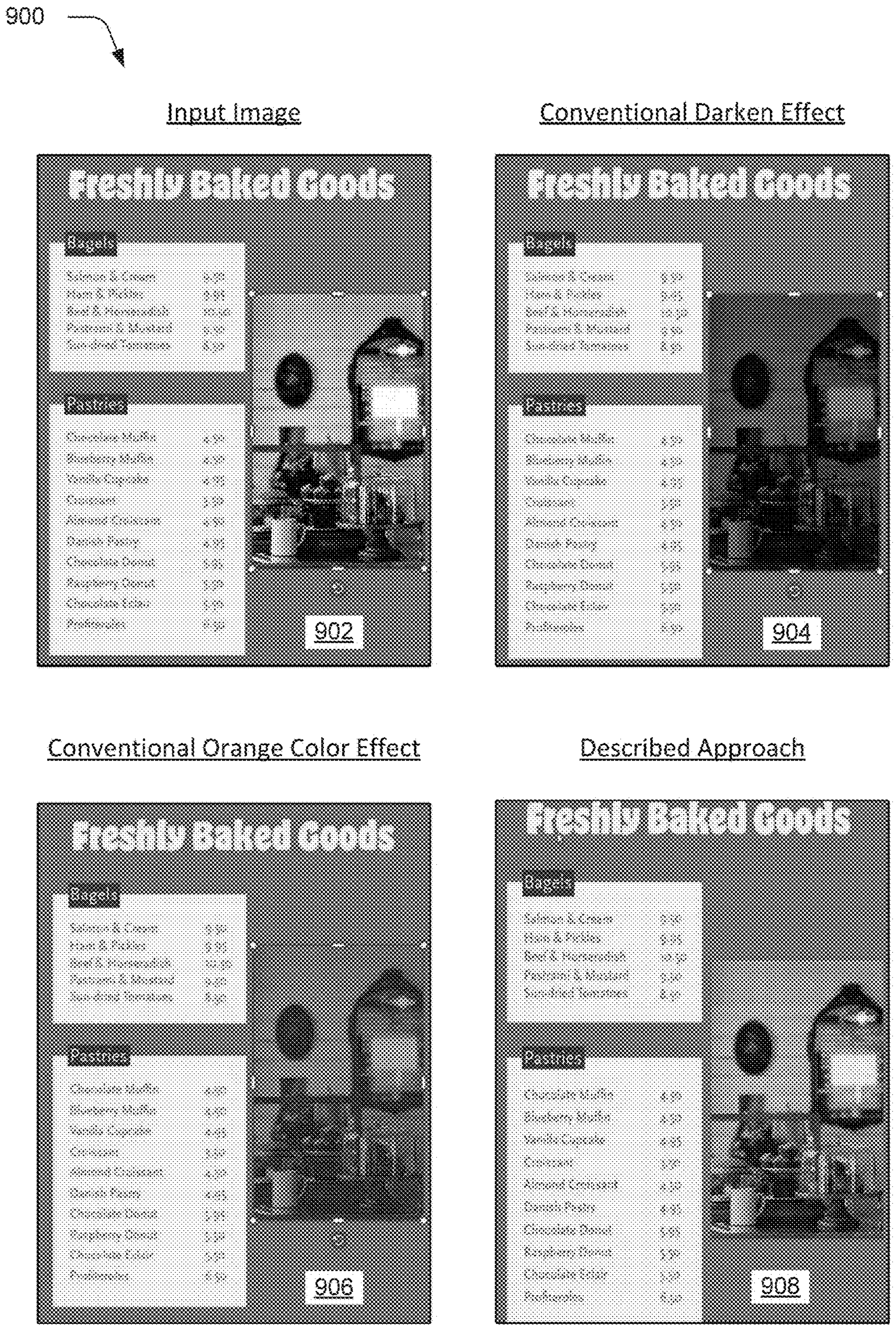
FIG. 9 depicts an example of a comparison of conventional approaches for color enhancement of digital images to match a template to the techniques described herein.

In contrast, FIG. 9 depicts an example 900 of a comparison of conventional approaches for color enhancement of digital images to match a template to the techniques described herein in a first image 902, a second image 904, a third image 906, and a fourth image 908. The first image 902 represents an input image (e.g., digital image 122 of FIG. 1 or image 804 of FIG. 8). The first image 902 is uploaded and inserted into a template (e.g., digital template 106 of FIG. 1 or template 802 of FIG. 8) by a user. The second image 904 represents a first conventional approach to apply a darkening effect to the image. The third image 906 represents a second conventional approach to apply a present orange color effect to the image. The fourth image 908 represents the described techniques for enhancement of the image using an image dominant color from the harmonic match to adjust the original image. As visually illustrated in FIG. 9, the user image and template in the fourth image 908 provide a better aesthetic balance than that provided in images 904 and 906 using conventional approaches. The second image 904 is too dark, while the third image 906 applies an orange effect that is too vibrant or similar to the orange color in the template.

In general, functionality, features, and concepts described in relation to the examples above and below are employed in the context of the example procedures described in this section. Further, functionality, features, and concepts described in relation to different figures and examples in this document are interchangeable among one another and are not limited to implementation in the context of a particular figure or procedure. Moreover, blocks associated with different representative procedures and corresponding figures herein are applicable together and/or combinable in different ways. Thus, individual functionality, features, and concepts described in relation to different example environments, devices, components, figures, and procedures herein are usable in any suitable combinations and are not limited to the particular combinations represented by the enumerated examples in this description.

Example Digital Content Enhancement Procedure

The following discussion describes techniques that are implementable utilizing the previously described systems and devices. Aspects of the procedure are implementable in hardware, firmware, software, or a combination thereof. The procedure is illustrated as a set of blocks that specify operations performed by one or more devices and are not necessarily limited to the orders shown for performing the operations by the respective blocks. In portions of the following discussion, reference is made to FIGS. 1 through 9.

Figure 10:
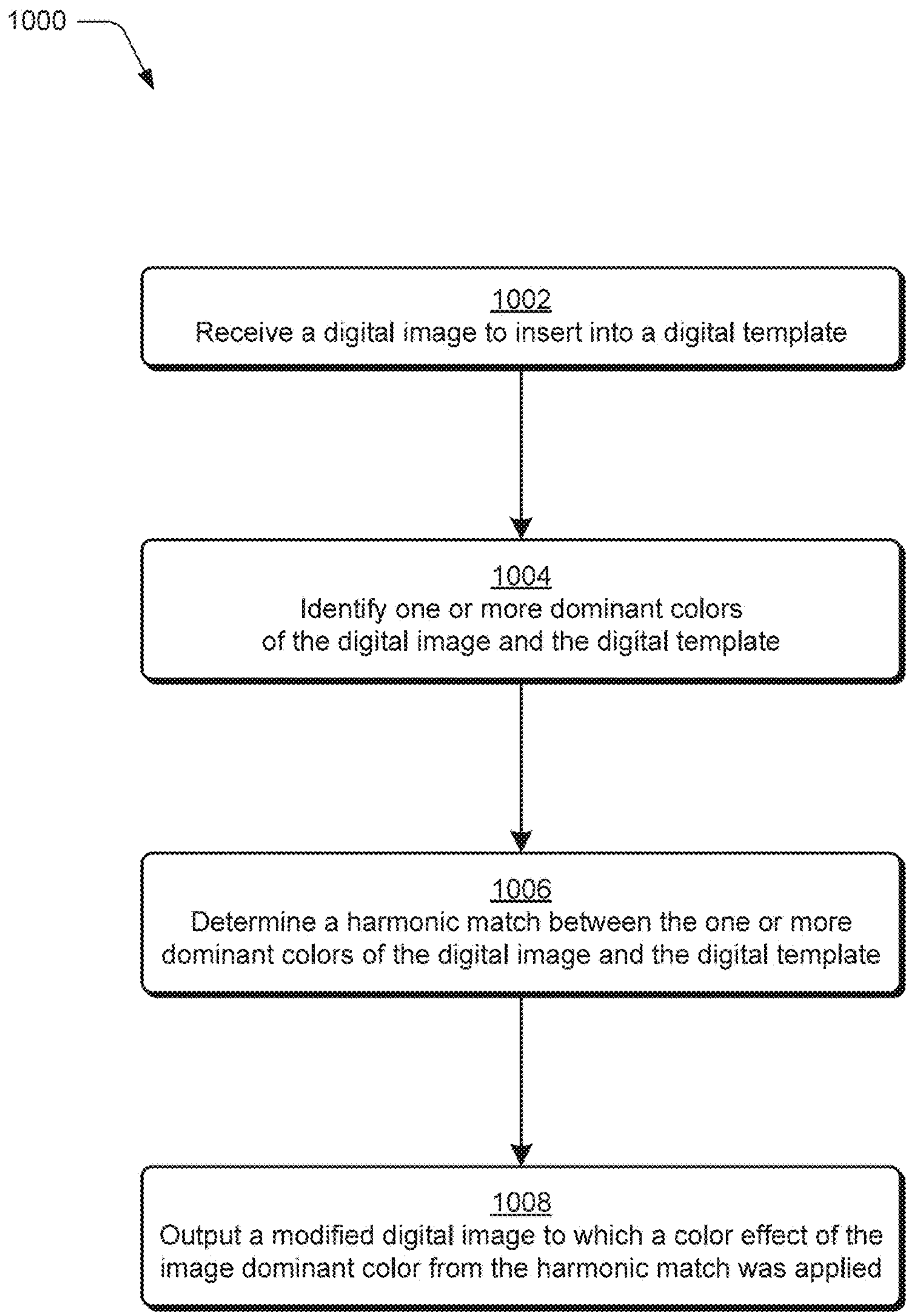
FIG. 10 is a flow diagram depicting a procedure in an example implementation in which a processing device color enhances a digital image to match a template.

FIG. 10 is a flow diagram depicting an algorithm as a step-by-step procedure 1000 in an example implementation that is performable by a processing device to enhance the coloring of the digital image 122 to match the digital template 106. In other implementations, one or more steps of the procedure 1000 are performed on additional digital images or digital content into which the digital image(s) are inserted.

To begin, a processing device (e.g., the content processing system 104) receives a digital image (e.g., digital image 122) to insert into a digital template (e.g., digital template 106) (block 1002). The digital image 122 and digital template 106 include, but are not limited to, digital photographs, digital videos, digital media, digital presentations, and so forth. In addition, the digital image 122 includes multiple digital content items in other scenarios. Generally, the digital template 106 represents other digital content (e.g., a template document, digital presentation, or video) with a coloring scheme different from the digital image 122.

The content processing system 104, using a machine-learning model, identifies one or more dominant colors of the digital image 122 and the digital template 106 (block 1004). To assist with identifying the image dominant colors 210, the content processing system 104 generally uses the machine-learning model 204 to generate a segmentation map 206 for the digital image 122 and then identifies the image dominant colors 210 corresponding to the image segments.

The color effects module 116 determines a harmonic match between the image dominant colors 210 and the template dominant colors 212 (block 1006). The content processing system 104 then applies a color effect to the digital image 122 based on the image dominant color 210 from the harmonic match 216 to output the modified digital image 118 (block 1008).

Example System and Device

Figure 11:
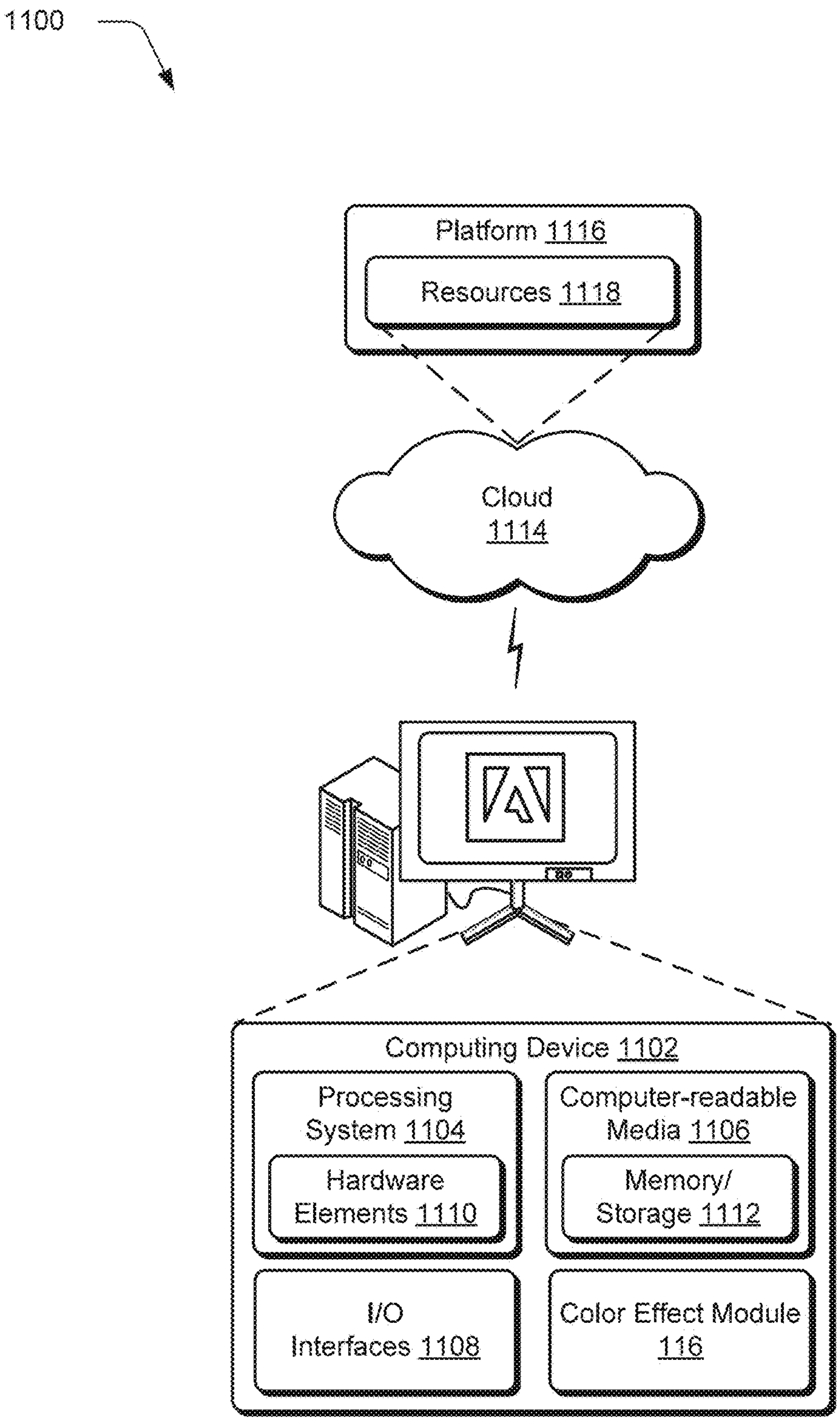
FIG. 11 illustrates an example system with an example computing device representative of one or more computing systems and/or devices usable to implement the techniques described herein.

FIG. 11 illustrates an example system 1100 that includes an example computing device 1102 that is representative of one or more computing systems and/or devices that implement the various techniques described herein. This is illustrated through inclusion of the color effects module 116. The computing device 1102 is configurable, for example, as a server of a service provider, a device associated with a client (e.g., a client device), an on-chip system, and/or any other suitable computing device or computing system.

The example computing device 1102, as illustrated, includes a processing system 1104, one or more computer-readable media 1106, and one or more I/O interface 1108 that are communicatively coupled to one another. Although not shown, the computing device 1102 further includes a system bus or other data and command transfer system that couples the various components from one to another. A system bus can include any one or combination of different bus structures, such as a memory bus or memory controller, a peripheral bus, a universal serial bus, and/or a processor or local bus that utilizes various bus architectures. A variety of other examples are also contemplated, such as control and data lines.

The processing system 1104 is representative of the functionality to perform one or more operations using hardware. Accordingly, the processing system 1104 is illustrated as including hardware element 1110 that is configurable as processors, functional blocks, and so forth. This includes implementation in hardware as an application-specific integrated circuit (ASIC) or other logic device formed using one or more semiconductors. The hardware elements 1110 are not limited by the materials from which they are formed or the processing mechanisms employed therein. For example, processors are configurable as semiconductor(s) and/or transistors (e.g., electronic integrated circuits (ICs)). In such a context, processor-executable instructions are electronically executable instructions.

The computer-readable media 1106 is illustrated as including memory/storage 1112. The memory/storage 1112 represents memory/storage capacity associated with one or more computer-readable media. The memory/storage 1112 includes volatile media (such as random access memory (RAM)) and/or nonvolatile media (such as read only memory (ROM), Flash memory, optical disks, magnetic disks, and so forth). The memory/storage 1112 includes fixed media (e.g., RAM, ROM, a fixed hard drive, and so on) as well as removable media (e.g., Flash memory, a removable hard drive, an optical disc, and so forth). The computer-readable media 1106 is configurable in a variety of other ways as further described below.

Input/output interface(s) 1108 are representative of functionality to allow a user to enter commands and information to computing device 1102 and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., employing visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1102 is configurable in a variety of ways, as further described below, to support user interaction.

Various techniques are described in the general context of software, hardware elements, or program modules. Generally, such modules include routines, programs, objects, elements, components, data structures, and so forth that perform particular tasks or implement particular abstract data types. The terms “module,” “functionality,” and “component” as used herein generally represent software, firmware, hardware, or a combination thereof. The features of the techniques described herein are platform-independent, meaning that the techniques are configurable on various commercial computing platforms with various processors.

An implementation of the described modules and techniques is stored on or transmitted across some form of computer-readable media. The computer-readable media includes a variety of media that is accessed by the computing device 1102. By way of example, and not limitation, computer-readable media includes "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media include but are not limited to RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and are accessible by a computer.

"Computer-readable signal media" refers to a signal-bearing medium configured to transmit instructions to the hardware of the computing device 1102, such as via a network. Signal media typically embodies computer-readable instructions, data structures, program modules, or other data in a modulated data signal, such as carrier waves, data signals, or other transport mechanisms. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1110 and computer-readable media 1106 are representative of modules, programmable device logic, and/or fixed device logic implemented in a hardware form that are employed in some embodiments to implement at least some aspects of the techniques described herein, such as to perform one or more instructions. Hardware includes components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware as well as a hardware utilized to store instructions for execution, e.g., the computer-readable storage media described previously.

Combinations of the foregoing are also employed to implement various techniques described herein. Accordingly, software, hardware, or executable modules are implemented as instructions and/or logic embodied on some form of computer-readable storage media and/or by one or more hardware elements 1110. The computing device 1102 is configured to implement particular instructions and/or functions corresponding to the software and/or hardware modules. Accordingly, implementation of a module that is executable by the computing device 1102 as software is achieved at least partially in hardware, e.g., through computer-readable storage media and/or hardware elements 1110 of the processing system 1104. The instructions and/or functions are executable/operable by one or more articles of manufacture (for example, one or more computing devices 1102 and/or processing systems 1104) to implement techniques, modules, and examples described herein.

The techniques described herein are supported by various configurations of the computing device 1102 and are not limited to the specific examples of the techniques described herein. This functionality is also implementable all or in part through a distributed system, such as over a "cloud" 1114 via a platform 1116 as described below.

The cloud 1114 includes and/or is representative of a platform 1116 for resources 1118. The platform 1116 abstracts the underlying functionality of hardware (e.g., servers) and software resources of the cloud 1114. The resources 1118 include applications and/or data that can be utilized while computer processing is executed on servers that are remote from the computing device 1102. Resources 1118 can also include services provided over the Internet and/or through a subscriber network, such as a cellular or Wi-Fi network.

The platform 1116 abstracts resources and functions to connect the computing device 1102 with other computing devices. The platform 1116 also abstracts the scaling of resources to provide a corresponding level of scale to the encountered demand for the resources 1118 implemented via the platform 1116. Accordingly, in an interconnected device embodiment, the implementation of functionality described herein is distributable throughout the system 1100. For example, the functionality is implementable in part on the computing device 1102 as well as via the platform 1116 that abstracts the functionality of the cloud 1114.

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method comprising:

receiving, by a processing device, a digital image to be inserted into a digital template;

identifying, using a machine-learning model, first dominant colors of the digital image, the first dominant colors being colors that appear in a largest number of pixels of the digital image;

identifying, using the machine-learning model, one or more second dominant colors of the digital template from existing graphic content of the digital template, the one or more second dominant colors being colors that appear in a largest number of pixels of the digital template;

determining, by the processing device and for each second dominant color of the digital template and each of one or more harmonic templates that define groups of colors on a color wheel that are harmonically matched, a respective second minimum distance between the second dominant color and sector boundaries of the harmonic template;

determining, by the processing device and for each first dominant color of the digital image and each of the one or more harmonic templates, a respective first minimum distance between the first dominant color and the sector boundaries of the harmonic template;

selecting, by the processing device, as a first harmonic template, a harmonic template of the one or more harmonic templates for which a particular second dominant color has a smallest respective second minimum distance among the one or more second dominant colors and the one or more harmonic templates, and selecting, as a second harmonic color, the particular second dominant color having the smallest respective second minimum distance;

selecting, by the processing device, as a first harmonic color, a first dominant color of the digital image that is closest to a sector boundary of the first harmonic template;

generating, by the processing device, a modified digital image by applying the first harmonic color as a color effect to the digital image by shifting hue values of the digital image to fit the first harmonic color; and inserting, by the processing device, the modified digital image into the digital template.

2. The method of claim 1, wherein identifying the first dominant colors of the digital image includes:

computing, for each region of at least one region of the digital image, a color histogram for the region; and assigning, using the machine-learning model, at least one dominant color for the region using the color histogram.

3. The method of claim 2, wherein the method further comprises assigning, using k-nearest neighbors (KNN) classification by the machine-learning model, the region to the at least one dominant color by classifying each pixel of multiple pixels in the region to a particular color based on a most common classification of k nearest neighbor pixels, k being a positive integer value.

4. The method of claim 2, wherein the color histogram comprises three luminance histograms indicating a brightness distribution of a red, green, or blue color channel, respectively, for each region.

5. The method of claim 1, wherein the one or more harmonic templates include a radial distribution of colors within a hue-saturation-value (HSV) color wheel that are aesthetically balanced, the one or more harmonic templates including at least one harmonic sector and at least two sector boundaries.

6. The method of claim 1, wherein applying the first harmonic color as the color effect includes blending the first harmonic color on the digital image to generate a blended image.

7. The method of claim 6, wherein applying the first harmonic color as the color effect further includes:

computing image gradients to detect edges in the blended image, wherein the edges are identified as local intensity changes above a threshold value and are defined as sets of connected pixels forming boundaries between two disjoint intensity regions; and performing histogram stretching on pixels corresponding to the edges in the blended image to generate the modified digital image, wherein the histogram stretching sharpens the modified digital image.

8. The method of claim 1, wherein the method further includes:

in response to receiving visual edits to the digital template, determining an updated harmonic match between the first dominant colors of the digital image and one or more updated second dominant colors of the digital template; and generating an updated modified digital image in real-time as the digital template is modified by applying an updated first harmonic color from the updated harmonic match as the color effect to the digital image.

9. The method of claim 1, wherein:

the modified digital image is automatically generated upon insertion into the digital template; and applying the first harmonic color as the color effect further includes adjusting the hue values of the digital image based on spatial coherence among colors of neighboring pixels.

10. The method of claim 1, wherein:

identifying the first dominant colors comprises identifying a respective first dominant color for each of multiple segmented regions of the digital image;

the harmonic match comprises, for each of the multiple segmented regions, a respective first harmonic color matched to a corresponding second harmonic color of the digital template; and applying the first harmonic color as the color effect comprises applying the respective first harmonic color of each segmented region to pixels of that segmented region.

11. The method of claim 1, further comprising generating a modified digital template by applying the second harmonic color as a color effect to the digital template by shifting hue values of the digital template to fit the second harmonic color, wherein inserting the modified digital image into the digital template comprises inserting the modified digital image into the modified digital template.

12. The method of claim 1, wherein the one or more second dominant colors of the digital template are identified independently of the first dominant colors of the digital image, and wherein the first harmonic template is selected based on the respective second minimum distances of the one or more second dominant colors of the digital template before the first harmonic color is selected from the first dominant colors of the digital image.

13. The method of claim 1, further comprising performing color-based image segmentation on the digital image, using the machine-learning model, to generate a segmentation map that identifies multiple segmented regions of the digital image, wherein the machine-learning model comprises a convolutional neural network having a contracting path that performs one or more convolutions to downsample a spatial resolution of the digital image and an expanding path that performs one or more convolutions to upsample feature representations into the segmentation map, and wherein identifying the first dominant colors of the digital image comprises identifying a respective first dominant color for each of the multiple segmented regions using the segmentation map.

14. A system comprising:

a memory component; and a processing device coupled to the memory component, the processing device configured to:

receive a digital image to be inserted into a digital template;

perform, using a machine-learning model, image segmentation on the digital image to identify multiple segmented regions;

identify, for each region in the digital image corresponding to a segmented region, a first dominant color using the machine-learning model, the first dominant colors of the digital image being colors that appear in a largest number of pixels of the digital image;

identify, using the machine-learning model, one or more second dominant colors of the digital template from existing graphic content of the digital template, the one or more second dominant colors being colors that appear in a largest number of pixels of the existing graphic content of the digital template;

determine, for each second dominant color of the digital template and each of one or more harmonic templates that define groups of colors on a color wheel that are harmonically matched, a respective second minimum distance between the second dominant color and sector boundaries of the harmonic template;

determine, for each first dominant color of the digital image and each of the one or more harmonic templates, a respective first minimum distance between the first dominant color and the sector boundaries of the harmonic template;

select, as a first harmonic template, a harmonic template of the one or more harmonic templates for which a particular second dominant color has a smallest respective second minimum distance among the one or more second dominant colors and the one or more harmonic templates, and select, as a second harmonic color, the particular second dominant color having the smallest respective second minimum distance;

select, as a first harmonic color, a first dominant color of the digital image that is closest to a sector boundary of the first harmonic template; and present a modified digital image inserted in the digital template, the modified digital image generated by applying the first harmonic color as a color effect to the digital image by shifting hue values of the digital image to fit the first harmonic color.

15. The system of claim 14, wherein the one or more harmonic templates include a radial distribution of colors within a hue-saturation-value (HSV) color wheel that are aesthetically balanced, the one or more harmonic templates including at least one harmonic sector and at least two sector boundaries.

16. The system of claim 14, wherein the processing device is configured to perform image segmentation on the digital image by:

applying a median filter to the digital image to create a gray image; and segmenting, using the machine-learning model, the gray image into the multiple segmented regions by assigning a segment label to each pixel in the gray image, wherein pixels with a same segment label share one or more visual characteristics.

17. The system of claim 16, wherein:

the median filter includes parameters to remove noise from the digital image; and the machine-learning model comprises a convolutional neural network.

18. A non-transitory computer-readable medium storing executable instructions, which when executed by a processing device, cause the processing device to perform operations comprising:

receive a digital image to be inserted into a digital template;

identify first dominant colors of the digital image, the first dominant colors being colors that appear in a largest number of pixels of the digital image;

identify one or more second dominant colors of the digital template from existing graphic content of the digital template, the one or more second dominant colors being colors that appear in a largest number of pixels of the existing graphic content of the digital template;

determine, for each second dominant color of the digital template and each of one or more harmonic templates that define groups of colors on a color wheel that are harmonically matched, a respective second minimum distance between the second dominant color and sector boundaries of the harmonic template;

determine, for each first dominant color of the digital image and each of the one or more harmonic templates, a respective first minimum distance between the first dominant color and the sector boundaries of the harmonic template;

select, as a first harmonic template, a harmonic template of the one or more harmonic templates for which a particular second dominant color has a smallest respective second minimum distance among the one or more second dominant colors and the one or more harmonic templates, and select, as a second harmonic color, the particular second dominant color having the smallest respective second minimum distance;

select, as a first harmonic color, a first dominant color of the digital image that is closest to a sector boundary of the first harmonic template; and present a modified digital image in the digital template or the digital image in a modified digital template via a user interface, the modified digital image generated by applying the first harmonic color as a color effect to the digital image by shifting hue values of the digital image to fit the first harmonic color, the modified digital template generated by applying the second harmonic color as a color effect to the digital template.

19. The non-transitory computer-readable medium of claim 18, wherein the non-transitory computer-readable medium includes further executable instructions, which when executed by the processing device, cause the processing device to perform additional operations comprising:

in response to receiving visual edits to the digital template, determine an updated harmonic match between the first dominant colors of the digital image and one or more updated second dominant colors of the digital template; and generate an updated modified digital image in real-time as the digital template is modified by applying an updated first harmonic color from the updated harmonic match as the color effect to the digital image.

20. The non-transitory computer-readable medium of claim 18, wherein:

the modified digital image or the modified digital template is automatically generated upon insertion of the digital image into the digital template; and applying the first harmonic color as the color effect further includes adjusting the hue values of the digital image based on spatial coherence among colors of neighboring pixels.

* * * * *